(12) United States Patent
Chen et al.

(10) Patent No.: US 6,361,916 B1
(45) Date of Patent: Mar. 26, 2002

(54) LOADED LATEX COMPOSITIONS WITH DYE AND STABILIZER

(75) Inventors: Huijuan D. Chen, Webster; Tien-Teh Chen, Penfield; Kevin W. Williams, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/460,998

(22) Filed: Dec. 14, 1999

(51) Int. Cl.[7] ............. C09D 11/02; C08J 3/05; B41J 2/015; G03G 9/00
(52) U.S. Cl. ............. 430/137.14; 430/105; 430/137.1; 430/627; 106/31.13; 106/31.27; 347/100; 523/334; 523/335
(58) Field of Search ............. 270/1.01; 347/95, 347/100; 106/31.13, 31.27; 430/3, 105, 137.1, 137.14, 627; 524/501; 523/334, 335

(56) References Cited

U.S. PATENT DOCUMENTS

| 4,199,363 A | 4/1980 | Chen |
| 4,237,194 A | 12/1980 | Upson et al. |
| 4,259,313 A | 3/1981 | Frank et al. |
| 4,303,769 A | 12/1981 | Chen |
| 4,401,787 A | 8/1983 | Chen |
| 4,713,314 A | 12/1987 | Namba et al. |
| 4,753,923 A | 6/1988 | Byers et al. |
| 4,766,049 A | 8/1988 | Croucher et al. |
| 5,326,692 A | 7/1994 | Brinkley et al. |
| 5,455,315 A | 10/1995 | Paine et al. |
| 5,547,728 A | 8/1996 | Cunningham et al. |
| 5,558,908 A | 9/1996 | Lukacs, III et al. |
| 5,594,047 A | 1/1997 | Nielsen et al. |
| 5,614,008 A | 3/1997 | Escano et al. |
| 5,852,074 A | 12/1998 | Tsutsumi et al. |
| 5,919,850 A | 7/1999 | Wang et al. |
| 6,210,871 B1 * | 4/2001 | Ishii et al. ........... 430/584 |

FOREIGN PATENT DOCUMENTS

EP    0 483 387 A1    5/1992

* cited by examiner

*Primary Examiner*—Shean C. Wu
(74) *Attorney, Agent, or Firm*—J. Jeffrey Hawley

(57) ABSTRACT

A composition that is useful in a wide variety of applications comprises a latex having water as a continuous phase and, as the dispersed phase, hydrophobic polymer particles having associated therewith both a dye and a stabilizer for the dye. In a particularly preferred embodiment, the dye is an infrared absorbing dye. The composition can be used as an inkjet ink, as a coating composition to form an infrared sensitive optical recording layer or for other purposes.

13 Claims, No Drawings

LOADED LATEX COMPOSITIONS WITH DYE AND STABILIZER

FIELD OF THE INVENTION

The present invention relates to new compositions, elements and processes. More specifically, the compositions of the present invention are dispersions of hydrophobic latex polymer particles having associated therewith both a dye and a stabilizer for the dye. Processes for making the composition and methods for making various elements using the compositions form other aspects of the invention.

DESCRIPTION RELATIVE TO THE PRIOR ART

Dyes are often unstable to light. Dyes which absorb in the infrared region are particularly susceptible to light fade. These dyes degrade more rapidly under light due to the fast reaction of the excited dye with reactive oxygen species. This degradation renders them useless for most applications without the presence of a stabilizer. When a dye is used to carry a data element, the degradation of this dye eventually results in the inability to retrieve the data element.

Dye stabilization is well known in the art. Mitsubishi Kasai (EP 0 483 387 A1) and TDK Corp. (U.S. Pat. No. 4,713,314) describes the use of cyanine dyes combined with metal stabilizers. Nickel formazan dyes have been described by Kodak as stabilizers for infrared dyes (U.S. Pat. No. 5,547,728). Additionally, metal dithiolene dyes alone have been disclosed as useful stable dyes for barcoding applications by Kodak (U.S. Pat. No. 4,753,923).

It is believed that the mechanism for most stabilization requires the close intimate contact of the stabilizer with the dye. In conventional systems, the dye and stabilizer materials are useful when they are coated together in relatively high concentration. Alternatively, relatively lower concentration of infrared absorbing dye can be used when a high stabilizer to dye ratio can be tolerated. The prior art is mainly directed to thin films of dye and stabilizer where residual color from these dyes is not detrimental. Examples of these types of application include CD storage media and thermal transfer donor elements.

However, in some applications only a low total concentration of dye and stabilizer can be tolerated. In particular, when dyes are needed at levels where they are invisible to the naked eye, high dilution of the dye and stabilizer are required. This, in turn, reduces the interaction between the dye and stabilizer. Especially in the case were ink jet printing is used to apply the dye to a print and the ink solution is relatively dilute, the stabilization effect is small.

There are several reasons why one might want to apply an infrared dye containing composition to the surface of an element carrying a photographic image. For example, a protective overcoat including the infrared absorbing dye can be applied as a final overcoat to assist in the stabilization of the underlying dye stability in an inkjet print. In another embodiment, information can be encoded using an infrared absorbing ink that is invisible to the naked eye over the surface of a photographic print. The information that is in coated on the surface of the print can be, for example, sound information and the like. The sound information can be encoded for example using barcoding, or some other form of the digital encoding. The surface of the print can then be "played" using a suitable infrared dye detecting apparatus.

Loaded latex particles are known for use in a variety of photographic and nonphotographic applications. For example, in U.S. Pat. No. 4,237,194 there is described in antistatic composition that uses a polyaniline salt loaded on a polymer latex particle. Coating of the latex composition followed by drying and core lessons of the latex, produce a suitable antistatic layer. It is also known to load latex particles with fluorescent labels in immunology research. (See for example U.S. Pat. No. 4,259,313) Also, multiple fluorescent dyes can be loaded onto the same latex particle to achieve useful results (see for example U.S. Pat. Nos. 5,326,692 and 5,919,850).

U.S. Pat. No. 5,852,074 discloses the use of latex compositions for inkjet inks. U.S. Pat. No. 5,614,008 describes "invisible" inkjet inks containing IR absorbing dyes.

None of the prior art however, discloses loading both a dye and a stabilizer for the dye onto the same latex.

SUMMARY OF THE INVENTION

We have found that dyes, particularly infrared absorbing dyes, can be stabilized at relatively low overall concentrations by associating both the dye and the stabilizer on the same polymer particle. The dye and a stabilizer on the surface of the particle are in close proximity and are in high concentration on the surface of the particle. Thus, the spatial distance between the dye in the stabilizer is not influenced by dilution of the latex and subsequent application to the surface of an element, such as a photographic element. Thus, according to the invention, there is provided a composition which is a latex having water as a continuous phase and, as the dispersed phase, hydrophobic polymer particles having associated therewith both a dye and a stabilizer.

In another aspect of the present invention, there is provided an inkjet ink that includes a composition of the invention wherein the dye is an infrared absorbing dye.

In another aspect of the invention, there is provided a photographic element having on the surface thereof, a coalesced latex of the invention wherein the dye is an infrared absorbing dye. Preferably, the coalesced latex forms a pattern representing digital information. The digital information is preferably sound information.

In another aspect of the invention, there is provided a process for associating the dye and stabilizer with the polymer particles in the latex. The process comprises the steps of:

(1) forming a solution by dissolving a dye and a stabilizer in a water miscible organic solvent, (2) forming a latex by dispersing hydrophobic polymer particles in an aqueous continuous phase, (3) blending the latex with the solution, and (4) loading of the polymer particles by removing the organic solvent thereby forming a latex having the dye and stabilizer associated therewith.

In another aspect of the invention there is provided a process for producing a photographic element having on the surface thereof a digital pattern of the coalesced latex of the invention comprising the steps of:

(1) applying the latex in a digital pattern to the surface of the photographic element by inkjet printing, and (2) coalescing the latex.

DETAILED DESCRIPTION OF THE INVENTION

The compositions of this invention provide a number of advantages over the prior art. One advantage is the ability to provide for good light stability at low overall concentrations of dyes and stabilizers. Where the dye is an infrared absorbing dye, this can result in the dyes, when applied to the surface of the photographic element, being stable yet invisible to the naked eye. In particular preferred embodiments the gloss of the invisible coalesced latex can be matched with the gloss of the underlying photographic element so as to afford near optimum print quality. Another advantage is that by using a latex of the invention, dye aggregation is minimized. Another advantage is that certain dyes that are otherwise unsuitable, for example because of their low solubility, can now be provided in stable form in compositions and in coated elements.

According to the present invention, the dye and the stabilizer must be "associated with" the hydrophobic latex particles in the composition. By "associated with" we mean that both the dye and the stabilizer are attached to or located within the polymer particle. That is, the dye and stabilizer are not merely mixed or dispersed with the latex dispersion as is known in the art, but must become a part of the individual polymer particles. That is, substantially all of the dye and stabilizer in the coating composition must be adsorbed, absorbed or otherwise become an integral part of the polymer particles. Reference is made to the following U.S. Pat. Nos.: 4,199,363; 4,304,769; 4,401,787; 5,558,908; 5,594,047.

A broad range of organic soluble dyes and stabilizers can be loaded onto polymer particles. Useful dyes and stabilizers are those which have a solubility of not less than about 0.5 milligrams per milliliter in an organic solvent such as methanol. Useful dyes include nickel-dithiolene dye complexes for dye-donor element used in laser-induced thermal dye transfer as described in U.S. Pat. Nos. 5,036,040 and 4,753,923; mixture of a metallized formazan dye with symmetrical and unsymmetrical cyanine dyes as described in U.S. Pat. No. 5,773,193; tetraphenyldithiolene complexes, asymmetrically substituted benzoins used in optical recording materials as described in U.S. Pat. No. 4,806,640; an infrared absorbent comprising a metal complex compound prepared by coordinating two thiorato bidentate ligands to a center metal and neutralizing a complex ion with a cation as described in U.S. Pat. No. 4,763, 966; and camphordithiolene complexes as described in U.S. Pat. No. 4,675,423; naphtholactamsquaric acid dyes as described in U.S. Pat. No. 4,830,951; cyanine dyes as described in "The Theory of the Photographic Process, 4$^{th}$ Edition, Chapter 8, edited by T. H. James, 1997. The currently preferred infrared absorbing dyes are described in the U.S. Pat. No. 4,830,951 to Durst described above.

Useful dyes include, coumarins, rhodamines, cyanines, phthalocyanine in napthophthalocyanines, squararines and croconines. The stabilizer can be any substance that enhances the dye light stability when co-loaded onto the polymer particles.

Useful stabilizers include nickle dithiolene dyes such as those described in "Nickle Dithiolene Complexes", Nakazumi, H et al, JSDC, Vol 106, 363–367, 1990; dithiolene dyes such as those described in "The Synthesis of Dithiolene Dyes with Strong Near-IR Absorption" Mueller-Westerhoff, U. T., et al, Tetrahedron Vol 47, No. 6, 1991, 909–932; bisdithio-a-diketones such as those described in "Preparation, Reactions and Structure of Bisdithio-a-diketone Complexes of Nickle, Palladium and Platinum" Schtuazer, G and Mayweg, V., J. Am. Chem. Soc., 87, 1965, 1483; dithiolato nickle complexes such as those described in "The influence of dithiolato nickle complexes on the light fastness of a thin layer of a nera infrared absorbing cyanine dye" Nakazumi, H et al JSDC, Vol. 105, 173–176, 1988; and bis-(thiobenzil) nickle compounds such as those described in "Bis-(thiobenzil) nickle compounds on their absorption spectra, reduction potential and singlet oxygen quenching efficiency" Shiozaki, H., et al, JSDC, Vol 105, 26–29, 1989.

In this invention, a stabilizing IR-absorbing dye (stabilizer) with an absorption wavelength maximum approximately equal to or longer than that of desired dye is added to the composition, such as an ink composition. This added dye usually has a lower or negligible absorption at the wavelength where the desired dye is "read", for example to produce sound from the surface of a print, due to the shifted $\lambda_{max}$. Preferably the stabilizing IR-absorbing dye has an absorption wavelength maximum at least about 100 nm longer than that of the desired IR dye or "signal" IR dye. If the stabilizing IR-absorbing dye is particularly stable, the shorter wavelength dyes will be stabilized for an extremely long time. In the event that the long wavelength dye is unstable, it will be sacrificed thereby extending the useful lifetime of the IR dye placed on the surface of the print.

In a preferred embodiment of the invention, the stabilizing IR-absorbing dye (stabilizer) has the following formula:

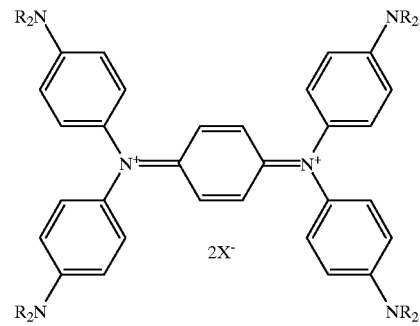

wherein each R individually represents a substituted or unsubstituted alkyl group having from 1 to about 6 carbon atoms, such as methyl, ethyl, propyl, butyl, methoxyethyl, ethoxymethyl, cyanomethyl, etc.; or a substituted or unsubstituted aryl group having from about 6 to about 12 carbon atoms, such as phenyl, methoxyphenyl, naphthyl, etc.; and X$^-$ represents an anionic counterion associated with the IR-absorbing dye, such as hexafluoroantimonate (SbF$_6^-$) or tetrafluoroborate (BF$_4^-$).

In a preferred embodiment, each R is C$_4$H$_9$.

Examples of IR-absorbing dyes which may be employed in the invention include the following dyes which are listed below with the numbers in parentheses of the stabilizing IR dye (SIRs) referring to the Aldrich Chemical Co. (Milwaukee, Wis.) Catalog number:

SIR 1 (42,413-7)

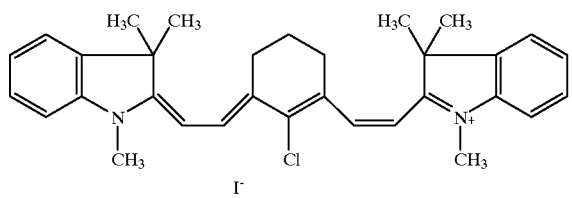

-continued
SIR 2 (42,531-1)
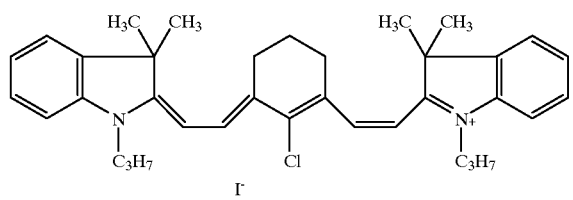
SIR 3 (42,598-2)
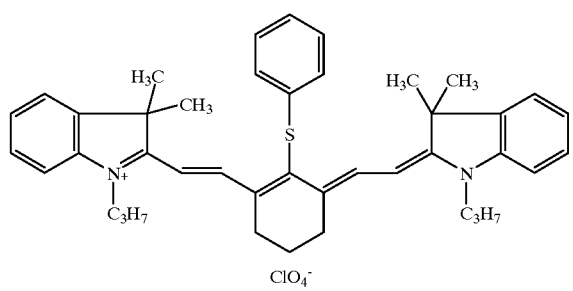
SIR 4 (20,093-2)
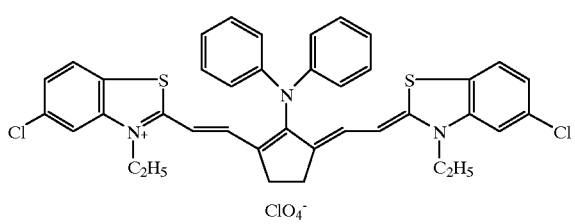
SIR 5 (40,610-4)
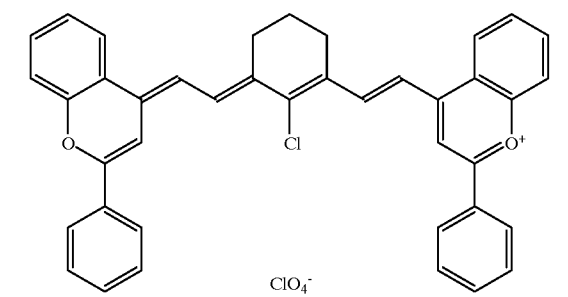
SIR 6 (40,513-2)
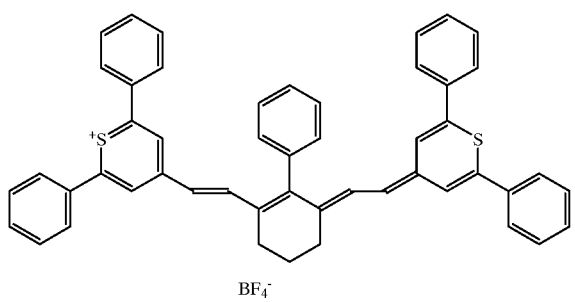
-continued
SIR 7 (40,516-7)
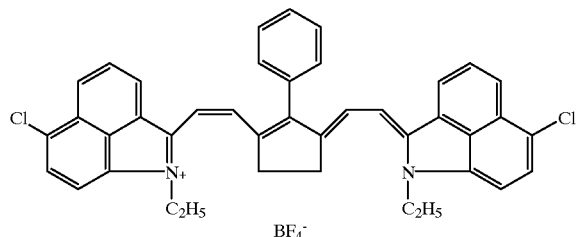
SIR 8 (40,514-0)
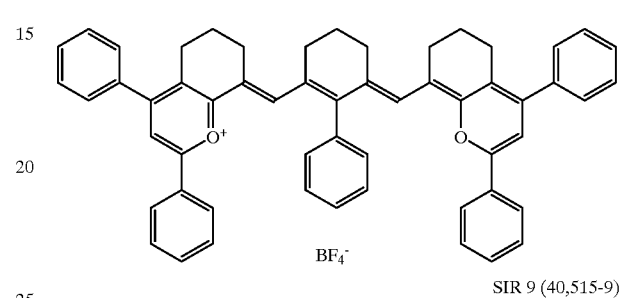
SIR 9 (40,515-9)
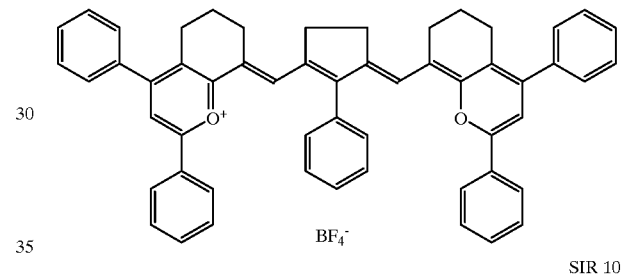
SIR 10
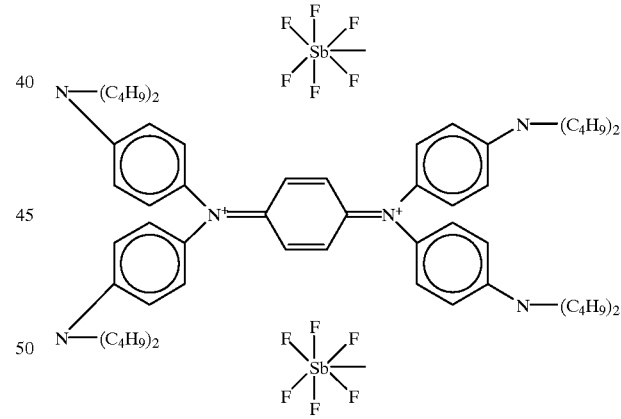
SIR 11
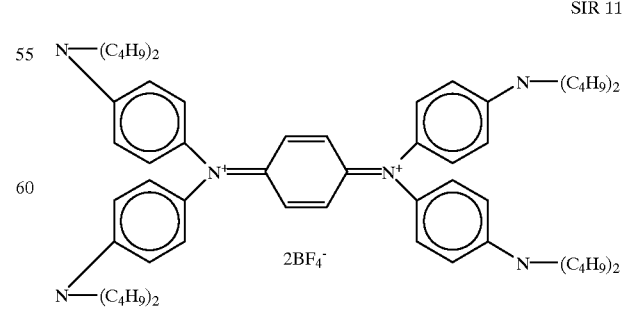

In forming the composition of the invention, the IR dye and stabilizer therefore are associated with polymer particles. This can be accomplished by dissolving the dye and stabilizer in a water-miscible organic solvent, mixing the solution with the polymer particles and then removing the solvent. Useful water-miscible organic solvents are water-miscible alcohols, ketones and amides, tetrahydrofuran, N-methyl-2-pyrrolidone, dimethylsulfoxide and mixtures thereof. Particular examples of these solvents include acetone, ethyl alcohol, methyl alcohol, isopropyl alcohol, dimethylformamide, methyl-ethyl ketone and the like.

The aqueous latices that are the preferred coating compositions consist essentially of water as a continuous phase and loaded polymer particles as a dispersed phase. The loadable polymer particles are those which meet the following test. At 25° C., the loadable polymer particles being tested must (a) be capable of forming a latex with water at a polymer-particle concentration of from 0.2 to 50 percent by weight, preferably 1 to 20 percent by weight, based on total weight of the latex, and (b) when 100 ml of the latex is then mixed in an equal volume of the water-miscible organic solvent to be employed in forming the loaded polymeric latex composition, stirred and allowed to stand for 10 minutes exhibit no observable coagulation of the polymer particles.

Aqueous latices can be prepared by free radical polymerization or by condensation polymerization. Emulsion polymerization is the preferred method of preparing polymer latices. Monomers suitable to prepare the polymer latices for this application include an acrylic acid, for example, acrylic acid, .alpha.-chloroacrylic acid, an .alpha.-alkylacrylic acid (such as methacrylic acid, etc.), etc., an ester or amide derived from an acrylic acid (for example, acrylamide, methacrylamide, n-butylacrylamide, t-butylacrylamide, diacetone acrylamide, methyl acrylate, ethyl acrylate, n-propyl acrylate, n-butyl acrylate, ter-butyl acrylate, isobutyl acrylate, 2-ethylhexyl acrylate, n-octyl acrylate, lauryl acrylate, tetrahydrofuryl acrylate, methyl methacrylate, ethyl methacrylate, n-butyl methacrylate, .beta.-hydroxy methacrylate, tetrahydrofuryl methacrylate, etc.), a vinyl ester (for example, vinyl acetate, vinyl propionate, vinyl laurate, etc.), acrylonitrile, methacrylonitrile, an aromatic vinyl compound (for example, styrene and a derivative thereof, vinyl toluene, divinyl benzene, vinyl acetophenone, sulfostyrene, etc.), itaconic acid, citraconic acid, crotonic acid, vinylidene chloride, a vinyl alkyl ether (for example, vinyl ethyl ether, etc.), an ester of maleic acid, N-vinyl-2-pyrrolidone, N-vinylpyridine, 2- or 4-vinylpyridine, etc. Of these monomers, an ester of acrylic acid, an ester of methacrylic acid, and styrene and styrene derivatives are particularly preferred. Two or more ethylenic unsaturated monomers can be used together. For example, a combination of methyl acrylate and butyl acrylate, ethyl acrylate and styrene, tetrahydrofuryl methacrylate and ethylacrylate, methyl acrylate and ethyl acrylate, etc., can be used.

The polymer latex can be prepared by emulsion polymerization or solution polymerization technique. Emulsion polymerization is preferred. Emulsion polymerization is well known in the art and is described, for example, in F. A. Bovey, Emulsion Polymerization, issued by Interscience Publishers Inc. New York, 1955. Examples of the chemical initiators which may be used include a thermally decomposable initiator, for example, a persulfate (such as ammonium persulfate, potassium persulfate, sodium persulfate), hydrogen peroxide, 4,4'-azobis(4-cyanovaleric acid), and redox initiators such as hydrogen peroxide-iron(II) salt, potassium persulfate-sodium hydrogensulfate, potassium persulfate-sodium metabisulfite, potassium persulfate-sodium hydrogen bisulfite, cerium salt-alcohol, etc. Emulsifiers which may be used in the emulsion polymerization include soap, a sulfonate(for example, sodium N-methyl-N-oleoyltaurate, sodium dodecylbenzene sulfonate alpha-olefin sulfonate, diphenyloxide disulfonate, naphthalene sulfonate,sulfosuccinates and sulfosuccinamates, polyether sulfonate, alkyl polyether sulfonate, alkylarylpolyether sulfonate, etc.), a sulfate (for example, sodium dodecyl sulfate), a phosphate (for example, nonylphenol ethoxylate phosphate, linear alcohol alkoxylate phosphate, alkylphenol ethoxylate phosphate, phenol ethoxylate), a cationic compound (for example, cetyl trimethylammonium bromide, hexadecyl trimethylammonium bromide, etc.), an amphoteric compound and a high molecular weight protective colloid (for example, polyvinyl alcohol, polyacrylic acid, gelatin, etc.).

A second class of polymer latices is aqueous dispersion of polyester such as Eastman AQ® polyesters produced by the Eastman Chemicals Company. The three polyesters, Eastman AQ 29, AQ 38, and AQ 55 are composed of varying amounts of isophthalic acid, sodium sulfoisophthalic acid, diethylene glycol, and 1,4-cyclohexanedimethanol. These thermoplastic, amorphous, ionic polyesters are prepared by a melt-phase condensation polymerization at high temperature and low pressure, and the molten product is extruded into small pellets. The solid polymer disperses readily in water at 70° C. with minimal agitation to give translucent, low viscosity dispersions containing no added surfactants or solvents. Varying the amount of ionic monomers, i.e. sulfoisophthalic acid, can control the particle size. The particle sizes range from 20 to 100 nm.

A third class of polymer latices is aqueous dispersion of polyurethane such as Witcobond® anionic and cationic polyurethane dispersion by Witco Corp. or Sancure® polyurethane by BF Goodrich Company. A review referenceon the aqueous dispersible polyurethane can be found in "Progress in Organic Coatings, 9(3), 281–340(1981), by Dieterich, D.". The synthesis of water dispersible polyurethane involves: (1) condensation polymerization of diols, diisocyanate, and a functional diol such as carboxyldiol, or sulfodiol in a water miscible organic solvent such as acetone or tetrahydrofaran; (2) neutralization of the polyurethane with amines or sodium hydroxide in water; and (3) chain extended with diamines and followed by removal of the low boiling organic solvent. Examples of diols include polytetrahydrofuryl diol, poly(tetramethylene adipate) glycol, poly (caprolactone) diol, poly(ethylenen glycol), etc. Examples of diisocyanate include hexamtethylene diisocyanate, 4,4'-bis(isocyanatocyclohexyl)methane, or other diisocyanates disclosed in column 6 of U.S. Pat. No. 4,147,679. Examples of the functional diols can be found in in "Progress in Organic Coatings, 9(3), pp. 292(1981), by Dieterich, D.".

In a preferred preparation process, the desired dye and stabilizer can be dissolved in an organic solvent and added dropwise to the polymer latex solution with vigorous stirring. Dye and stabilizer concentration in the organic solvent is preferably 0.1–5% by weight, more preferably 0.5–2% by weight. The latex solution preferably contains 1–20% polymer by weight, more preferably 2–10% by weight. Then the organic solvent can be removed by evaporation and the latex solution filtered through a 0.25 µm filter to obtain a dye loaded latex stock solution. The solution can be dialyzed to remove any remaining free dye molecules in water.

In the final composition, the weight ratio of dye to latex polymer is not critical. Typical dye to polymer weight ratios can be from 1:100 to 1:5, preferably 1:80 to 1:8 and still more preferably 1:40 to 1:8. Similarly, while it is desirable to have at least the same amount of stabilizer compared to the dye present, here again the ratio of dye to stabilizer is not critical. Typical dye to stabilizer weight ratios can be from 2:1 to 1:10. As noted, it is preferable to have at least as much stabilizer as dye and therefore, the preferred dye to stabilizer weight ratio is between 1:1 to 1:5. In particularly preferred embodiments, it is preferred to have the dye in close proximity to the stabilizer on the latex particle. Thus, it is desirable to have a high amount of dye to latex polymer and a high amount of stabilizer to dye. In weight ratio terms, it is preferred to have a weight ratio of dye to polymer of 1:40 or less and, at the same time, a weight ratio of dye to stabilizer of 1:1 to 1:2.

The compositions of the invention can be used in a variety of applications. For example, the compositions can be coated on a suitable support and can be used of optical recording. The compositions can be used in thermal dye transfer elements. In a preferred embodiment, the compositions can take the form of inkjet inks.

A final ink solution can be prepared by proper dilution of the dye loaded latex stock solution with distilled water and appropriate surfactants, humectants, and other inkjet ink additives known in the art. The concentration of the dye material in the ink solution can be 0.005%~1% by weight, preferably 0.01%~0.5% by weight. A suitable surfactant such as Surfynol® 465 surfactant (an ethoxylated dialcohol surfactant sold by Air Products and Chemicals, Inc.) can be added at 0.5%–2% by weight, with the presence of 2–10% glycerol, 2–10% diethyleneglycol, 2–10% propanol, and 0%–2% triethanolamine.

As noted, various additives may be added to the inkjet inks of the invention. Suitable additives include surfactants, surface active agents, defoaming agents, corrosion inhibitors and biocides.

Preferred surface active agents or surfactants are the nonionic types containing polyalkylene oxide moieties. A particularly preferred type of nonionic surfactant is obtained by ethoxylating acetylenic diols, such as ethoxylated tetramethyl decynediol (Surfynol® 465, provided by Air Products and Chemicals, Inc., Allentown, Pa. 18195).

The activity of the surfactant may be controlled by addition of a defoaming agent or defoamer. A preferred defoamer is comprised of a mixture of tetramethyldecynediol and propylene glycol (Surfynol® 104 PG, provided by Air Products and Chemicals, Inc., Allentown, Pa. 18195).

The term biocide is used to describe various antifungal compounds used to prevent or control the growth of various fungi upon prolonged standing of the ink compositions. A useful biocide is 1,2-benzisothiazolin-3-one (Proxel®GXL, ICI Americas Inc., Wilmington, Del. 19897).

Corrosion inhibitors are added to the ink formulations to inhibit or reduce corrosion of the metal parts, particularly the nozzles/orifices, of the ink jet printers. A preferred class of corrosion inhibitors are the 1H-benzotriazoles and 1H-benzotriazole itself is the preferred corrosion inhibitor (Cobratec® 99, PMC Specialties, Cincinatti, Ohio).

In one embodiment, the composition is an inkjet ink containing an invisible infrared dye. The composition is applied using an inkjet printer to the photograph containing surface of a photographic print. The print can be any form of photographic print, for example an inkjet print, a thermal dye transfer print or a silver halide photographic print. The inkjet ink composition of the invention can be applied in a pattern that represents digital data, for example sound data. After application, the composition is coalesced on the surface. Coalescence can be accomplished by simply drying the composition. Alternatively, some heat may be applied to facilitate coalescence.

In this embodiment, it is important that the pattern not be noticeable to those viewing the print. Not only must there be little noticeable optical density in the visible region of the spectrum but the gloss of the applied pattern must match the gloss of the underlying print. The gloss of the underlying print can vary widely, as is known in the art. "Glossy" prints can be produced as well as "matte" prints. In order to match the gloss of the deposited inkjet ink of the invention with the underlying print gloss, the latex polymer in the composition can be carefully selected. For example, for high gloss applications, a latex polymer with relatively low Tg is selected. A low Tg promotes complete coalescence and thus, high gloss. In matte situations, a relatively higher Tg is selected so as to produce partial coalescence that more closely matches the gloss of the matte surface. Latex polymers with a wide variety of Tgs are known and gloss can be matched with simple trial and error. That is, if the deposited pattern is too glossy or shiny compared to the surface of the print, a latex polymer with slightly higher Tg is tried. Conversely, if the pattern is less glossy or hazy compared to the surface of the print, a latex polymer with slightly lower Tg is tried. "Matching" is usually a subjective judgement of a skilled observer. However, gloss can be measured using instruments and the examples below illustrate one method of determining "matching" gloss using a meter.

Commercial inkjet printers such as HP690C or Epson Stylus Color 200 can used for testing, with a printing resolution of 300 or 360 dpi. For invisible codes, either step-wedge files or two-dimensional barcode (encoding compressed information such as sound) can be printed digitally onto various supports at the visual reflection density of 0.01–1.0, preferably 0.05–0.4.

In the examples, light stability was evaluated for 1 week at 5.4 Klux daylight, and the stability was evaluated based on the percent density loss of the absorption maximum of the printed sample at dye concentration of 0.025% by weight in ink. The reflection spectra were obtained with the BP Lambda 19 UV/Vis/NIR spectrometer with an integrating sphere using an aperture mask to allow only the coated area of the paper to be measured. The glossiness of the prints was measured with a BYK Gardner Micro-TRI-gloss meter with an incident angle of 60°.

EXAMPLES

Structures of dyes, stabilizers and polymers are shown in structural formula immediately following the examples.

Example 1

Dye and Stabilizer Loaded Latex

Comparative Example A "C-A"

To prepare comparative inkjet ink, 3.75 mg of the water soluble dye (3), 0.15 g Surfynol® 465 (from Air Products), 0.75 g glycerol, 0.6 g diethyleneglycol, 0.75 g propanol were added to 5.4 g distilled water. The final ink contained 0.025% wt dye, and 1% wt Surfynol 465, 5% wt glycerol, 4% wt diethyleneglycol and 5% wt propanol. The solution was filtered through a 0.45 µm filter and filled into a refillable inkjet cartridge. A step wedge image was printed on a Kodak medium weight photographic quality inkjet paper with an Epson 200 inkjet printer at 360 dpi resolution. The sample was then irradiated under 5.4 Klux daylight for a week; the light stability was calculated based on the percent density loss of the sample at $\lambda_{max}$ at the highest density step. The results are shown in Table 1.

Comparative Example B

An element similar to Comparative Example A was prepared except that both dye (3, 3.75 mg) and stabilizer (6, 7.5 mg) were used to prepare the ink instead of just dye (3).

Comparative Example C

An element similar to Comparative Example A was prepared as follows: to 8.8 g of 17% polymer latex (7) stock solution was added 16.2 g of water and 25.0 g of methanol. The resulting composition was stirred vigorously at room temperature to form the latex solution. To prepare a dye solution, 12.5 mg of dye (1) was dissolved in a mixture of 2.5 ml of methanol and 2.5 ml of methylene chloride. The dye solution was then added dropwise to the latex solution with continuous stirring. After 1 hour, the organic solvent was removed under reduced pressure. The resulting dye (1) loaded latex stock solution was filtered through a 0.45 μm filter. The concentration of dye (1) in the latex stock solution was estimated to be 500 ppm, and polymer concentration was ~6% by weight.

Example 1

A dye loaded latex stock solution similar to C-C was prepared except that both dye (1, 12.5 mg) and stabilizer (5, 12.5 mg) were loaded onto polymer latex (7).

Comparative Example D

A dye loaded latex stock solution similar to C-C was prepared except that dye (2, 12.5 mg) was loaded onto polymer latex (7).

Example 2

A dye loaded latex stock solution similar to C-C was prepared except that both dye (2, 12.5 mg) and stabilizer (5, 12.5 mg) were loaded onto polymer latex (7).

Comparative Example E

To 8.6 g of the stock solution of polymer latex (7) (29% wt) stock solution was added 16.4 g of water and 25.0 g of methanol. The resulting composition was stirred vigorously at room temperature to form the latex solution. To prepare a dye solution, 12.5 mg of dye (4) was dissolved in a mixture of 2.5 ml of methanol and 2.5 ml of methylene chloride. The dye solution was then added dropwise to the latex solution with continuous stirring. After 1 hour, the organic solvent was removed under reduced pressure. The resulting dye (4) loaded latex stock solution was filtered through a 0.45 μm filter. The concentration of dye (4) in the latex stock solution was estimated to be 500 ppm. And the polymer concentration was ~10% by weight.

Example 3

A dye loaded latex stock solution similar to C-E was prepared except that both dye (4, 12.5 mg) and stabilizer (5, 12.5 mg) were loaded onto polymer latex (7).

In general, the prepared inkjet ink solution was filled into a refillable inkjet cartridge. To prepare the ink containing dye loaded latex, 15 g Surfynol® 465 (from Air Product), 0.75 g glycerol, 0.6 g diethyleneglycol, 0.75 g propanol was added to a calculated amount of the dye loaded stock solution prepared above. A make up amount of distilled water was added so that the final ink contains 0.025% wt dye, and 1% wt Surfynol® 465, 5% wt glycerol, 4% wt diethyleneglycol and 5% wt propanol. The total amount of final ink solution was 15.0 g. The solution was filtered through a 0.45 μm filter and filled into a refillable cartridge.

A step wedge image was printed on a Kodak medium weight photographic quality inkjet paper with an Epson 200 inkjet printer at 360 dpi resolution. The sample was then irradiated under 5.4 Klux daylight for a week; the light stability was calculated based on the percent density loss of the sample at $\lambda_{max}$ for the highest density step. The results are shown in Table 1.

TABLE 1

| Example | Dye | Stabilizer | Polymer | $\lambda_{max}$ (nm) | $D_{max}$ (Before) | $D_{max}$ (After) | % Loss |
|---|---|---|---|---|---|---|---|
| C-A | (3) | — | — | 882 | 0.29 | 0.00 | 100.0 |
| C-B | (3) | (6) | — | 882 | 0.28 | 0.00 | 100.0 |
| C-C | (1) | — | (7) | 835 | 0.30 | 0.01 | 100.0 |
| 1 | (1) | (5) | (7) | 835 | 0.29 | 0.10 | 66.7 |
| C-D | (2) | — | (7) | 883 | 0.32 | 0.01 | 96.9 |
| 2 | (2) | (5) | (7) | 883 | 0.31 | 0.15 | 51.6 |
| C-E | (4) | — | (8) | 883 | 0.25 | 0.16 | 36.0 |
| 3 | (4) | (5) | (8) | 883 | 0.24 | 0.17 | 29.1 |

Light Stability (5.4 klux daylight, 1 week)

The advantage of the ability of using organic soluble dyes such as dye (1), (2) and (4) in a water based ink is obvious from the above examples, since the water soluble dyes especially infrared dyes are sometimes not easily accessible. It is clear from Table 1 that co-loading dyes and stabilizers on various latex polymers did enhance the light stability of the dye significantly. A direct comparison of the results for the printed samples of structurally similar dyes (3) and (2) shows that co-loading dye and stabilizers on polymer latex (as shown in element 1 and 2) effectively enhanced the light stability of the dye. Similar dye and stabilizer homogenous mixtures (Comparative Example B) show no stabilization at all in the presence of the stabilizer.

The results also show that dye (4) is the preferred dye for the inkjet ink compositions of the invention. This dye shows the least amount of fade even without any stabilization and is further improved by the presence of the stabilizer on the latex polymer particles.

Comparative Example F

To 7.9 g of 31.5% polymer dispersion (AQ55, commercially available from Eastman Chemical) was added 17.1 g of water and 25.0 g of methanol, and stirred vigorously at room temperature to form a uniform dispersion. To form a dye solution 30 mg of dye (4) was dissolved in a mixture of 2.5 ml of methanol and 2.5 ml of methylene chloride. The dye solution was then added dropwise to the above dispersion with continuous stirring. After 1 hour, the organic solvent was removed under reduced pressure. The resulting dye (4) loaded polymer dispersion stock solution was filtered through a 0.45 μm filter. The concentration of dye (4) in the latex stock solution was estimated to be 500 ppm. The dye to polymer ratio (by weight) is estimated to be 1:80.

Example 4

A dye loaded polymer dispersion stock solution similar to C-F was prepared except that both dye (4, 12.5 mg) and stabilizer (5, 25.0 mg) were loaded onto polymer AQ55. The dye to polymer ratio (by weight) is estimated to be 1:80.

Example 5

A dye loaded polymer dispersion stock solution similar to C-F was prepared except that 4.0 g (instead of 7.9 g) of 31.5% polymer dispersion (AQ55) was used. The dye to polymer ratio (by weight) is estimated to be 1:40.

Example 6

A dye loaded polymer dispersion stock solution similar to C-F was prepared except that 0.8 g (instead of 7.9 g) of 31.5% polymer dispersion (AQ55) was used. The dye to polymer ratio (by weight) is estimated to be 1:8.

Inkjet ink compositions were made and tested from the stock solutions described in examples C-F through 6 above in a manner similar to that described in Example 3. The results are compared as the dye/polymer ratio varies in Table 2.

TABLE 2

| Example | Dye | Stabilizer | Polymer | Dye/polymer ratio | $\lambda_{max}$ (nm) | $D_{max}$ (Before) | Light Stability (5.4 Klux daylight, 1 week) $D_{max}$ (After) | % Loss |
|---|---|---|---|---|---|---|---|---|
| C-F | (4) | — | AQ55 | 1:80 | 901 | 0.25 | 0.16 | 36.0 |
| 4 | (4) | (5) | AQ55 | 1:80 | 901 | 0.26 | 0.18 | 30.8 |
| 5 | (4) | (5) | AQ55 | 1:40 | 901 | 0.25 | 0.19 | 24.0 |
| 6 | (4) | (5) | AQ55 | 1:8 | 901 | 0.24 | 0.20 | 16.7 |

The above table shows that the stabilization effect increase as the dye/polymer ratio decrease, because the spatial distance between dye and stabilizer on the polymer particles increase.

Example 7

To produce an inkjet ink composition, 14.0 g of water and 25.0 g of methanol were added to 11.0 g of a stock solution of polymer latex (7) (22.7% solids by weight). The solution was stirred vigorously at room temperature to form the latex solution. Then, 30.0 mg of dye (4) and 30 mg of stabilizer (5) were dissolved in a mixture of 2.5 ml of methanol and 2.5 ml of methylene chloride. The dye/stabilizer solution was then added dropwise to the latex solution with continuous stirring. After 1 hour, the organic solvent was removed under reduced pressure. The resulting dye (4) loaded latex stock solution was filtered through a 0.45 μm filter. The concentration of dye (4) in the latex stock solution was estimated to be 500 ppm, and the polymer concentration was 10% by weight. To 7.5 g of this dye loaded latex solution was added 0.15 g Surfynol® 465 (from Air Products), 0.75 g glycerol, 0.6 g diethyleneglycol, 0.75 g propanol and a make up amount of distilled water. The final ink contains 0.025% wt dye, 0.025% wt of stabilizer, 1% wt Surfynol® 465, 5% wt glycerol, 4% wt diethyleneglycol and 5% wt propanol. The total amount of final ink solution was 15.0 g. The resulting solution was filtered through a 0.45 μm filter and filled into a refillable inkjet cartridge.

To produce a photographic element of the invention, a step wedge image was printed on a Kodak photoweight photographic quality inkjet paper with an Epson 200 inkjet printer at 360 dpi resolution. The gloss of the prints was measured with a BYK Gardner Micro-TRI-glossmeter with an incident angle of 60°. The results are shown in Table 3.

Example 8

An element similar to Example 7 was prepared except that the receiver for printing was Kodak medium weight photographic quality inkjet paper rather than Kodak photoweight photographic quality inkjet paper.

Example 9

An element similar to Example 7 was prepared except that latex polymer (8) was used instead of latex polymer (7).

Example 10

An element similar to Example 9 was prepared except that the receiver for printing was Kodak medium weight photographic quality inkjet paper rather than Kodak photoweight photographic quality inkjet paper.

Example 11

An element similar to Example 7 was prepared except that latex polymer (9) was used instead of latex polymer (7).

Example 12

An element similar to Example 11 was prepared except that the receiver for printing was Kodak medium weight photographic quality inkjet paper rather than Kodak photoweight photographic quality inkjet paper.

Example 13

An element similar to Example 7 was prepared except that polymer dispersion AQ55 was used instead of latex polymer (7).

Example 14

An element similar to Example 13 was prepared except that the receiver for printing was Kodak medium weight photographic quality inkjet paper rather than Kodak photoweight photographic quality inkjet paper.

Example 15

An element similar to Example 13 was prepared except that the receiver for printing was Kodak photographic glossy paper containing a full-color image rather than Kodak photoweight photographic quality inkjet paper.

Example 16

An element similar to Example 9 was prepared except that the receiver for printing was Kodak professional photographic matted paper containing a full-color image rather than Kodak photoweight photographic quality inkjet paper.

The results of Examples 7–16 are compared in Table 3.

TABLE 3

| Element | Dye | Stabilizer | Polymer | Polymer Tg (° C.) | Receiver | Gardner gloss (60°) at $D_{max}$ | Blank | Gloss difference |
|---|---|---|---|---|---|---|---|---|
| 7 | (4) | (5) | (7) | 126 | Kodak photoweight inkjet paper | 59.0 | 82.5 | −23.5 |
| 8 | (4) | (5) | (7) | 126 | Kodak medium weight inkjet paper | 45.0 | 50.0 | −5.0 |
| 9 | (4) | (5) | (8) | 60 | Kodak photoweight inkjet paper | 51.3 | 81.9 | −30.6 |
| 10 | (4) | (5) | (8) | 60 | Kodak medium weight inkjet paper | 45.4 | 50.1 | −4.7 |
| 11 | (4) | (5) | (9) | 20 | Kodak photoweight inkjet paper | 71.6 | 82.1 | −10.5 |
| 12 | (4) | (5) | (9) | 20 | Kodak medium weight inkjet paper | 48.2 | 50.3 | −2.1 |

TABLE 3-continued

| Element | Polymer Dye | Stabilizer | Polymer | Tg (° C.) | Receiver | Gardner gloss (60°) at $D_{max}$ | Blank | Gloss difference |
|---|---|---|---|---|---|---|---|---|
| 13 | (4) | (5) | AQ55 | 55 | Kodak photoweight inkjet paper | 81.0 | 82.6 | −1.6 |
| 14 | (4) | (5) | AQ55 | 55 | Kodak medium weight inkjet paper | 58.7 | 50.3 | 8.4 |
| 15 | (4) | (5) | AQ55 | 55 | Kodak photographic paper glossy | 87.9 | 90.1 | −2.2 |
| 16 | (4) | (5) | (8) | 60 | Kodak professional photographic paper (matted) | 42.5 | 41.7 | 0.8 |

Table 3 shows that different polymer latex/dispersions on difference receiver result in the difference in the gloss of the print. Choosing the appropriate type of polymer latex/dispersions as the delivering vehicle, the gloss of the printed code and the support (such as color prints) can be matched (within 10 Garner Gloss units in this measurement) such that the printed code will not be observable by the viewer. Examples 15 and 16 the embodiment where the invisible dye loaded polymer particles are printed on either glossy or matted photographic full color prints where the gloss matching is achieved.

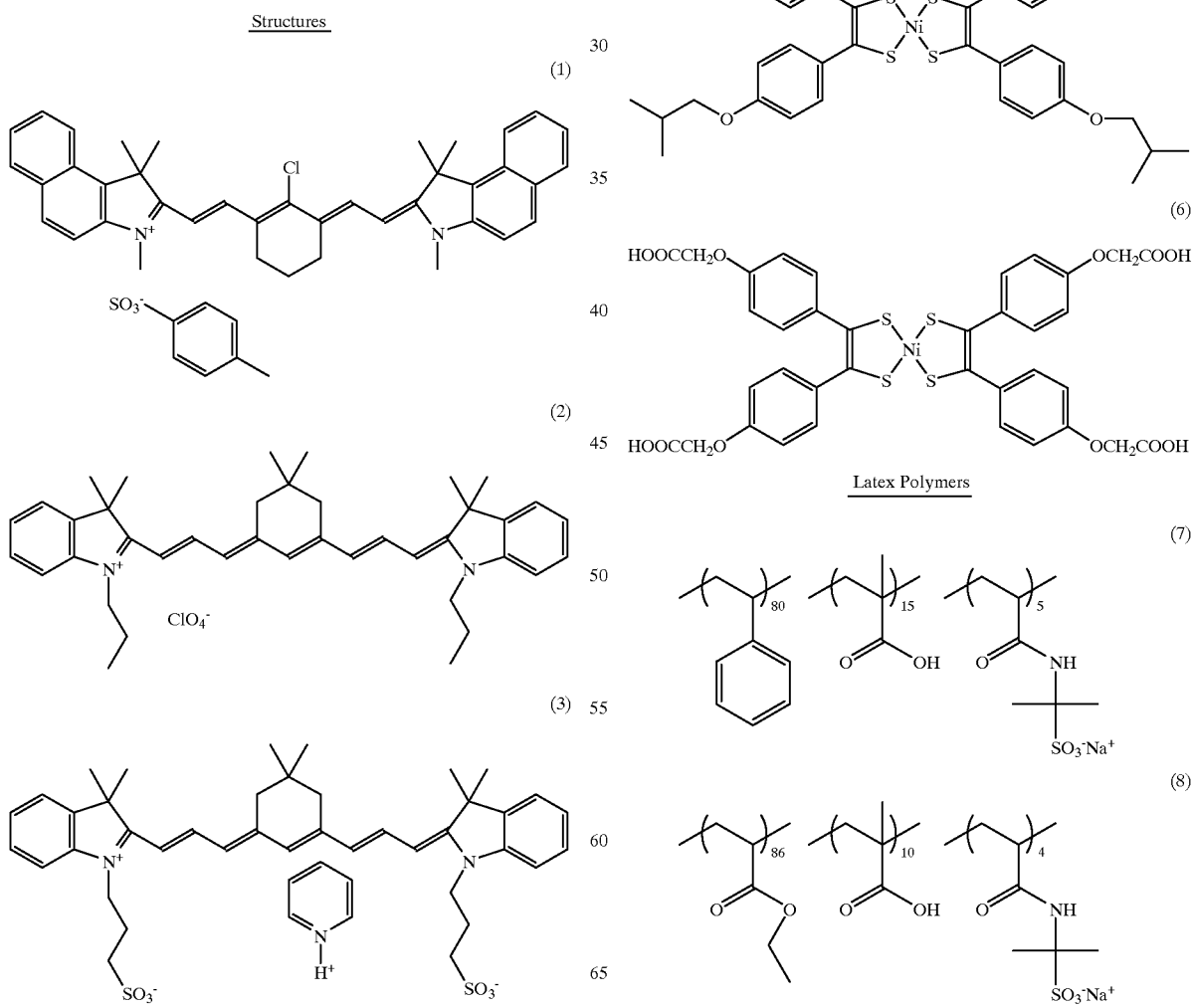

-continued

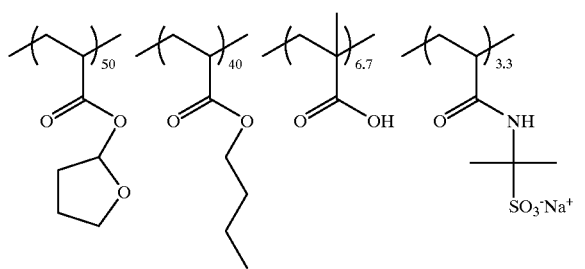

(9)

What is claimed is:

1. A latex composition comprising water as a continuous phase and, as the dispersed phase, hydrophobic polymer particles having associated therewith both an infrared absorbing dye having a λmax and a stabilizer which has negligible absorption at said λmax.

2. A composition according to claim 1 which is an inkjet ink.

3. A composition according to claim 1 wherein said dye is a naphtholactamsquaric acid dye.

4. A composition according to claim 1 wherein the weight ratio of said dye to said polymer is between 1:40 to 1:8.

5. A composition according to claim 4 wherein the weight ratio of said dye to said stabilizer is between 1:1 and 1:2.

6. A photographic print having on the photograph containing surface thereof, a coalesced hydrophobic polymer particles having associated therewith both an infrared absorbing dye having a max and a stabilizer which has negligible absorption at said λmax.

7. A photographic print according to claim 6 wherein said coalesced particles have a gloss that matches said surface.

8. A photographic print according to claim 6 wherein said dye is a naphtholactamsquaric acid dye.

9. A photographic print according to claim 6 wherein said coalesced polymer particles on said surface of said print are in a pattern representing a digital signal.

10. A photographic print according to claim 9 wherein said digital pattern represents sound information.

11. A process for associating both an infrared absorbing dye having a λmax and a stabilizer which has negligible absorption at said max with polymer particles in a latex comprising the steps of:

(1) forming a solution by dissolving a dye and a stabilizer in a water miscible organic solvent, (2) forming a latex by dispersing hydrophobic polymer particles in an aqueous continuous phase, (3) blending the latex with the solution, and (4) loading of the polymer particles by removing the organic solvent thereby forming a latex having the dye and stabilizer associated therewith.

12. A process for producing a photographic element having on the photograph containing surface thereof a digital pattern of coalesced latex hydrophobic polymer particles having associated therewith both an infrared absorbing dye having a λmax and a stabilizer which has negligible absorption at said λmax comprising the steps of:

(1) applying said latex in a digital pattern to said surface of said photographic element by inkjet printing, and (2) coalescing said latex.

13. The process according to claim 12 wherein said digital pattern represents sound information.

* * * * *